Patented Dec. 6, 1938

2,139,540

UNITED STATES PATENT OFFICE 2,139,540

PROCESS FOR OBTAINING HORMONE SUBSTANCE

Edward A. Doisy, Webster Groves, and Philip A. Katzman, St. Louis, Mo., assignors to President and Board of Trustees of St. Louis University, St. Louis, Mo.

No Drawing. Application June 24, 1935,
Serial No. 28,210

13 Claims. (Cl. 167—74)

The invention relates to a method for obtaining physiologically active gonadotropic material from urine, said active material being distinguishable by its ability to cause premature sexual phenomena and development and luteinization of the ovaries when injected into immature laboratory animals. Such active material is usually referred to as being due to an anterior pituitary-like sex hormone.

The method herein described is definitely advantageous over any method previously in use or considered, in that it has conclusively shown its efficacy in obtaining said active material not only from the urine of pregnant women wherein it is present in abundance, but also from the urine of normal males and females and from castrate and menopausal urine from which a type of activity even more closely related to the sex hormone activity of the anterior pituitary appears to be present although in relatively small amounts.

Our method consists in the formation in the urine of a precipitate of a water-insoluble inorganic acid capable of precipitating proteins, such as tungstic or molybdic acid, the formation of which causes the active material to be precipitated therewith also. The precipitate formed is not necessarily due to direct salt formation but may be in the nature of a protein-heavy-metal-acid precipitate upon which the gonadotropic activity is adsorbed. When non-pregnancy urine is used containing only small amounts of the gonadotropic substance, it is preferable to add, prior to the precipitation, casein or other protein material capable of forming insoluble tungstates and molybdates.

The active substance is then separated from the inorganic acid by suitable means. Preferably it is recovered from the precipitate and caused to go into solution in water by the use of organic bases capable of combining with the water insoluble acids. Examples of such organic bases are brucine, quinine, cinchonin, 8-hydroxyquinoline or benzidine. The mixture of precipitate, water and organic base is allowed to react together for a considerable period of time in a cool place usually one to thee days. This period of time allows the organic base to complete its combination with the water-insoluble acid and results in the formation of a precipitate insoluble in water. The gonadotropic substance is retained in the water solution which can be separated from the insoluble precipitate by centrifugation or filtration.

Quantities of brucine or other bases that may be present in the water solution can be removed by extracting the aqueous solution with chloroform or other suitable solvent, leaving behind the substantially pure active material in solution. The organic bases may also be removed by precipitating the active fraction with acetone in which solvent the organic bases are soluble.

If it is desired to further purify the active material or obtain it in solid form, the aqueous solution after removal of the inert base-acid precipitate is subjected to fractional precipitation with acetone or alcohol substantially by the methods disclosed in our Patent No. 2,035,642 issued March 31, 1936.

Example 1.—To 10 liters of pregnancy urine are added 200 cc. of 10% sodium tungstate solution in water. In the case of urine of normal males or females there is added previously 10 to 20 grams of casein to facilitate the subsequent precipitation. The mixture is then acidified with 10% $H_2SO_4$ so that the reaction to Congo red paper is distinctly blue. This acidification results in the formation of a precipitate of tungstic acid plus the active substance of the urine.

The precipitate containing the active substance is recovered by filtration or centrifugation. In order to remove coloring matter and estrogenic substances this precipitate is washed thoroughly with acetone. The acetone is then removed from the precipitate by the use of reduced pressure leaving behind a crude powder containing the anterior-pituitary-like substance.

The crude powder is mixed with a sufficient quantity of distilled water which is usually about 10 to 30 times the quantity of the powder. To the mixture of powder and water is added a sufficient amount of solid brucine so that the reaction of the mixture is neutral or slightly alkaline to litmus. The resulting mixture of crude powder, water and brucine is allowed to react together in a cool place for one to three days. This period of time allows the brucine to complete its combination with the tungstic acid and results in the formation of a precipitate insoluble in water. However, the active material containing the gonadotropic substance is retained in the water solution and can be separated from the insoluble precipitate by centrifugation or filtration. The brucine present in the solution of the active material is removed by extraction with chloroform leaving behind the substantially pure active material in solution. The brucine may also be removed if desired by precipitating the active fraction with acetone. The precipitate thus formed is redissolved in water and precipitated again with acetone until the brucine is completely removed.

*Example 2.*—To 10 liters of pregnancy urine are added 200 cc. of 10% sodium molybdate solution in water. The mixture is then acidified so that the reaction to Congo red paper is distinctly blue. This acidification results in the formation of a precipitate of molybdic acid plus the active substance of the urine. The precipitate is then treated in accordance with Example 1.

*Example 3.*—In isolating the gonadotropic activity from urines relatively low in potency and in particular from normal, castrate, and menopausal urine, a practically quantitative recovery may be obtained by the addition of a small amount of protein material which itself will form a precipitate with tungstic or related acids and thus adsorb the gonadotropic activity.

To 10 liters of such urine there are added 100 cc. of 10% sodium tungstate solution and 100 cc. of 0.5% casein solution. The solution is then made faintly acid to Congo red with dilute sulfuric acid, the precipitate collected by centrifugation, washed with acetone and worked up as in Example 1.

*Example 4.*—The crude powder obtained in Example 1 comprising the tungstic acid precipitate and the gonadotropic substance may be treated by other methods to remove the tungstic acid. Thus in one modified method, the powder is dissolved in dilute alkali such as sodium hydroxide and barium chloride, and barium hydroxide added to precipitate the tungstic acid leaving the gonadotropic substance in solution. The barium chloride in the solution is removed by adding sodium sulphate thereby precipitating barium sulphate.

*Example 5.*—To the aqueous solution of the gonadotropic substance obtained in Example 1 after brucine treatment, there is added 0.1 volume of concentrated ammonia water (sp. gr. 0.91). Enough acetone is then added to give a concentration of 50% by volume. The mixture is thoroughly chilled and then centrifuged to remove the precipitate which, since it is mainly ammonium urate, is discarded.

The acetone concentration in the supernatant liquid is then increased to 60% which precipitates the gonadotropic substance leaving a large quantity of inert substance in the solution. The precipitate is redissolved in water and again acetone is added to reprecipitate the gonadotropic substance. This precipitate is substantially free from tungsten, brucine and all toxic substances and is sufficiently pure so that large amounts may be injected into rats without detectable ill effects.

From the solution obtained by dissolving the tungstic acid precipitate with brucine, there may be obtained if desired a solid product containing the gonadotropic hormone. The potency of this product ranges from 10 to 30 rat units per milligram of solid material. It is stable and may be stored in the solid form until it is desired to obtain a more highly purified product therefrom. The more highly purified product obtained by the acetone precipitation may also be stored in the solid state. Preferably the material is dehydrated with acetone. The dry powder has a potency of 100 to 300 rat units per milligram. It may be used as such for therapeutic purposes but it is of greater use as a starting material for isolating the pure substance itself or substances sufficiently pure for practical medicinal use.

From the above description it will be seen that the new process is adapted for the rapid production of the gonadotropic substances from urine. A high yield is obtained by a relatively simple and inexpensive procedure. It is especially adapted for treating urine directly without previous purification, but it should be understood that it is not limited thereto and may also be used for obtaining the gonadotropic substance from other solutions containing the same either in relatively large or relatively small amounts.

What we claim as our invention is:

1. The process of obtaining a gonadotropic substance comprising forming in urine a precipitate of a compound of the class consisting of tungstic and molybic acids, separating the precipitate from the liquid, treating the precipitate with an aqueous solution of a compound of the class consisting of brucine alkaloid, quinine, cinchonine, 8-hydroxyquinoline and benzidine thereby obtaining the gonadotropic substance in the solution while leaving said acid compound as a precipitate and removing the solution of the gonadotropic substance from the precipitate.

2. The process of obtaining a gonadotropic substance comprising adding a soluble tungstate to urine, acidifying the solution to precipitate tungstic acid thereby carrying down the gonadotropic substance with the precipitate, separating the precipitate from the liquid, treating the precipitate with an aqueous solution containing brucine thereby dissolving the gonadotropic substance and leaving the tungstic acid undissolved and separating the solution of the gonadotropic substance from the precipitate.

3. In the process of obtaining the gonadotropic substance, the steps of adding directly to pregnancy urine a soluble compound of the class consisting of tungstates and molybdates, acidifying the urine to precipitate the corresponding acid compound carrying the gonadotropic substance therewith and separating the precipitate from the liquid.

4. In the process of obtaining the gonadotropic substance, the steps of adding directly to non-pregnancy urine a soluble compound of the class consisting of tungstates and molybdates, adding also a protein substance capable of forming an insoluble tungstate or molybdate, acidifying the urine to cause a precipitate of the corresponding tungstic or molybdic acids and separating the precipitate which contains the gonadotropic substance from the liquid.

5. In the process of obtaining the gonadotropic substance, the steps of adding directly to non-pregnancy urine a soluble compound of the class consisting of tungstates and molybdates, adding casein also, acidifying the urine to cause a precipitate of the corresponding tungstic or molybdic acids and separating the precipitate which contains the gonadotropic substance therewith from the liquid.

6. In the process of obtaining the gonadotropic substance, the steps of adding directly to non-pregnancy urine a soluble tungstate and casein, acidifying the urine to cause a precipitate of tungstic acid and separating the tungstic acid precipitate which contains the gonadotropic substance therewith from the liquid.

7. In the process of obtaining the gonadotropic substance, the step of forming directly in the urine which contains the gonadotropic substance and also contains proteins, a precipitate of tungstic acid thereby removing the gonadotropic substance from the urine and obtaining the same in the tungstic acid precipitate.

8. In the process of obtaining the gonadotropic substance, the steps of forming in urine a precipitate of a compound of the class consisting of tungstic and molybdic acids, and separating the precipitate which contains the gonadotropic substance therewith from the liquid.

9. In the process of obtaining the gonadotropic substance, the steps of adding a protein to urine, forming in said urine a precipitate of a compound of the class consisting of tungstic and molybdic acids, and separating the precipitate which contains the gonadotropic substance therewith from the liquid.

10. In the process of obtaining the gonadotropic substance, the steps of forming in urine a precipitate of a compound of the class consisting of tungstic and molydic acids, separating the precipitate which contains the gonadotropic substance therewith from the liquid, treating the precipitate with acetone to remove impurities, and removing the acetone from the precipitate.

11. In the process for obtaining the gonadotropic substance, the steps of treating a compound of the class consisting of tungstic and molydic acids, having associated therewith the gonadotropic substance with water and a compound of the class consisting of brucine alkaloid, quinine, cinchonine, 8-hydroxyquinoline and benzidine, thereby obtaining the gonadotropic substance in the solution while leaving said acid compound as a precipitate, and removing the solution of the gonadotropic substance from the precipitate.

12. In the process for obtaining the gonadotropic substance, the steps of treating a compound of the class consisting of tungstic and molybdic acids, having associated therewith the gonadotropic substance with water and brucine, thereby obtaining the gonadotropic substance in the solution while leaving said acid compound as a precipitate, and removing the solution of the gonadotropic substance from the precipitate.

13. The process of obtaining the gonadotropic substance comprising adding to urine a soluble compound of the class consisting of tungstates and molybdates, acidifying the urine to precipitate the corresponding acid compound carrying the gonadotropic substance therewith, separating the precipitate from the liquid, treating the precipitate with acetone to remove impurities, removing the acetone from the precipitate, mixing the precipitate with water and solid brucine, allowing said mixture to react until the gonadotropic substance is dissolved, separating the solution from the solid matter, and removing brucine from the solution.

EDWARD A. DOISY.
PHILIP A. KATZMAN.